United States Patent [19]

Stensland

[11] Patent Number: 5,074,709
[45] Date of Patent: Dec. 24, 1991

[54] DEVICE AND METHOD FOR CONTAINING FLUID SPILLS

[76] Inventor: Gary E. Stensland, 24814 - 47th South, Kent, Wash. 98032

[21] Appl. No.: 471,871
[22] Filed: Jan. 29, 1990
[51] Int. Cl.⁵ .............................................. E02B 15/04
[52] U.S. Cl. ...................................... 405/68; 405/63; 405/66
[58] Field of Search ................................. 405/63–72; 156/213, 145, 218, 227, 466, 198; 210/243.3

[56] References Cited

U.S. PATENT DOCUMENTS

| Re. 27,640 | 5/1973 | Logan . | |
|---|---|---|---|
| 3,537,587 | 3/1970 | Kain . | |
| 3,563,036 | 2/1971 | Smith et al. . | |
| 3,565,257 | 2/1971 | Cavalieri . | |
| 3,613,376 | 10/1991 | Midby . | |
| 3,613,377 | 10/1971 | Zaugg | 405/68 |
| 3,638,429 | 2/1972 | Sladek et al. . | |
| 3,653,213 | 4/1972 | Childers . | |
| 3,667,235 | 6/1972 | Preus et al. . | |
| 3,695,042 | 10/1972 | Denison . | |
| 3,701,258 | 10/1972 | Rhodes . | |
| 3,718,001 | 2/1973 | Harper . | |
| 3,768,656 | 10/1973 | Nugent . | |
| 3,775,982 | 12/1973 | Lamboley . | |
| 3,783,621 | 1/1974 | Preus et al. . | |
| 3,792,589 | 2/1974 | Sayles | 405/72 X |
| 3,803,848 | 4/1974 | Vant't Hof . | |
| 3,807,177 | 4/1974 | Oberg | 405/66 |
| 3,919,847 | 11/1975 | Baller . | |
| 3,921,407 | 11/1975 | Neal . | |
| 3,939,663 | 2/1976 | Tezuka et al. . | |
| 3,943,720 | 3/1976 | Milgram . | |
| 4,000,618 | 1/1977 | Stovall . | |
| 4,096,700 | 1/1978 | Musamatsu et al. . | |
| 4,124,981 | 11/1978 | Preus | 405/66 |
| 4,146,344 | 3/1979 | Steen et al. . | |
| 4,174,185 | 11/1979 | Taki . | |
| 4,174,186 | 11/1979 | Kasai et al. . | |
| 4,188,155 | 2/1980 | Langermann . | |
| 4,190,381 | 2/1980 | Knaus et al. . | |
| 4,237,237 | 12/1980 | Jarre et al. . | |
| 4,248,547 | 2/1981 | Brown . | |
| 4,300,856 | 11/1981 | Magoon et al. . | |
| 4,310,415 | 1/1982 | Webb . | |
| 4,333,726 | 6/1982 | Fuxelius . | |
| 4,422,797 | 12/1983 | McAllister et al. . | |
| 4,432,874 | 2/1984 | Lundin . | |
| 4,507,017 | 3/1985 | Magoon . | |
| 4,619,553 | 10/1986 | Fischer . | |
| 4,640,645 | 2/1987 | Simpson et al. . | |
| 4,645,376 | 2/1987 | Simpson . | |
| 4,652,173 | 3/1987 | Kallestad | 405/72 X |
| 4,692,059 | 9/1987 | Juitilainen . | |
| 4,781,493 | 11/1988 | Fischer | 405/72 X |
| 4,802,791 | 2/1989 | Fisher et al. . | |

Primary Examiner—Dennis L. Taylor
Attorney, Agent, or Firm—David L. Garrison; Paul L. Griffiths

[57] ABSTRACT

An elongated floating boom device for containing spilled fluids such as crude oil, is disclosed. The boom device is manufactured from its constituent components at the spill site. At least one continuous sheet of a plastic material is folded along its longitudinal axis, forming two wall sections of substantially equal height. A lower weighted section is formed by introducing inexpensive ballast heavy material such as sand into the fold of the plastic sheet and creating an horizontal seal which seals the wall sections together above the ballast material along the length of the plastic sheet. A pulling means such as a chain or steel cable also is provided in the weighted section. Pillow or float sections are formed by injecting air between the wall sections above the first horizontal seal and vertically or diagonally sealing the wall sections together at intervals and then horizontally sealing the tops of the wall sections together. Alternative constructions for the bottom device also are disclosed. A method of containing fluid spills also are disclosed.

22 Claims, 6 Drawing Sheets

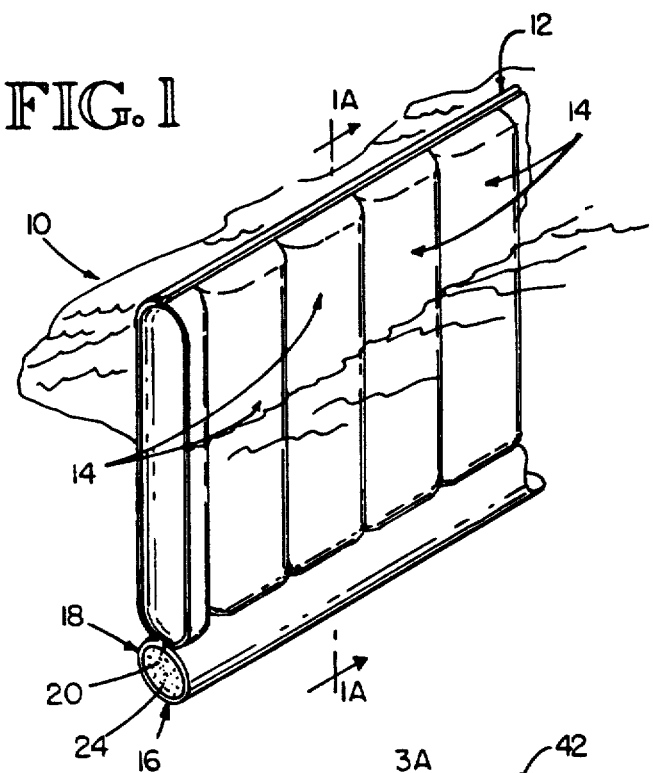
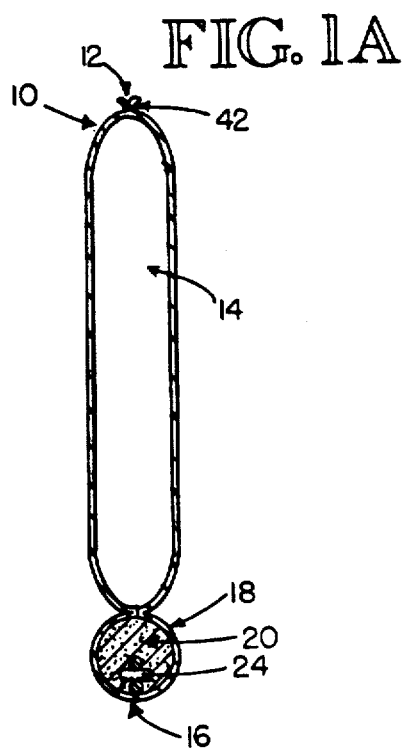
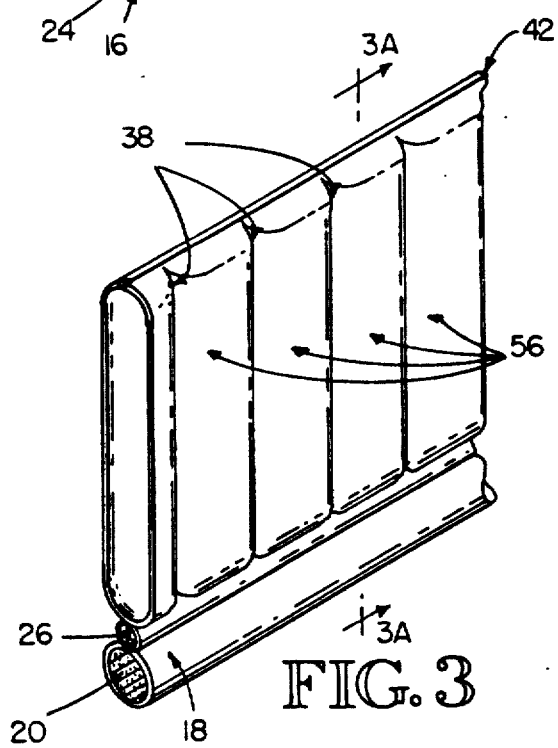
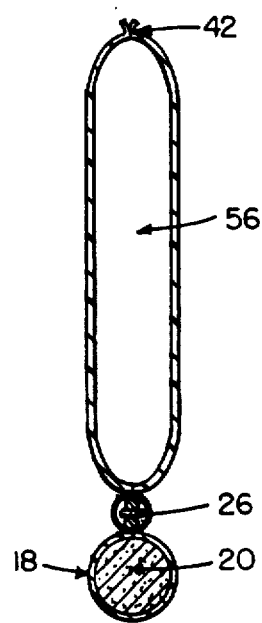

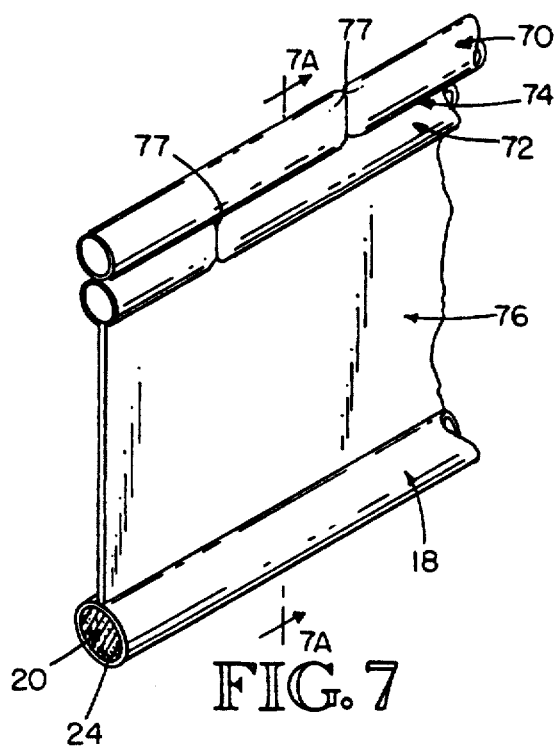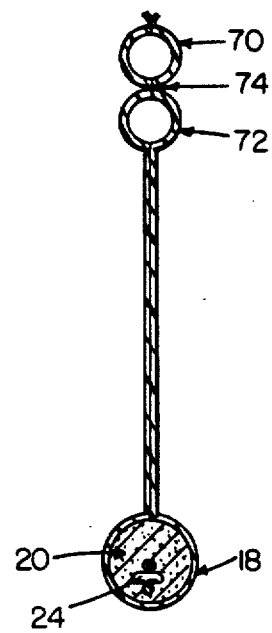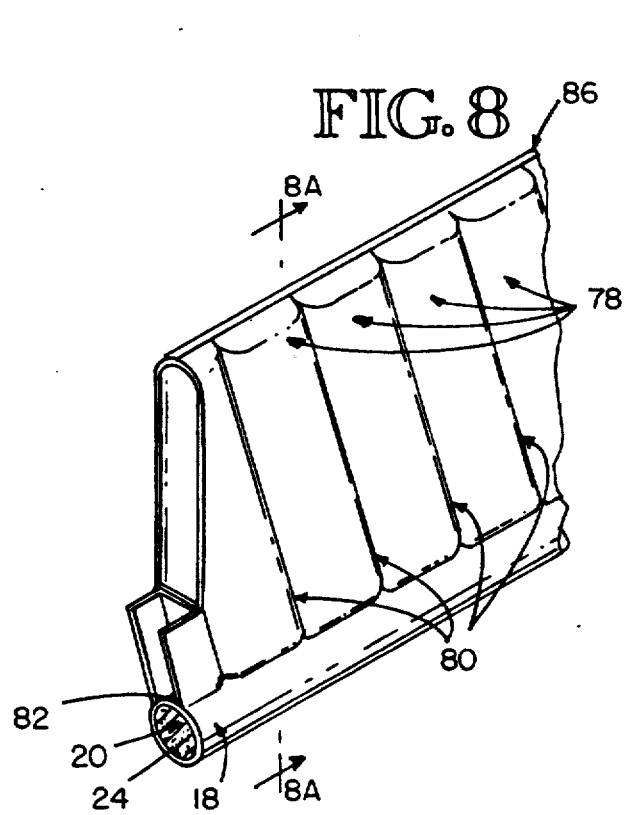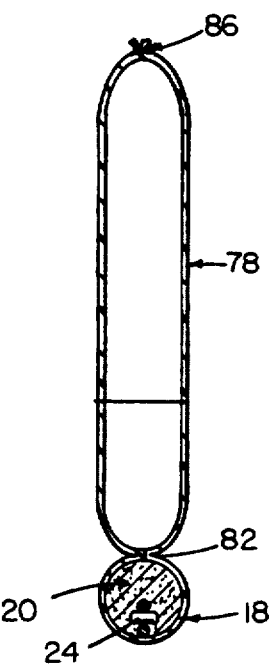

DEVICE AND METHOD FOR CONTAINING FLUID SPILLS

TECHNICAL FIELD

The present invention relates to floating boom devices for containing spilled fluids, and, more particularly, relates to a floating boom device used for containing fluid spills such as crude oil with a plurality of float sections interconnected in a continuous manner and which has an elongated weighted section which extends substantially along the length of the device attached to the plurality of float sections from below. The entire boom device is manufactured at site of the spill from its constituent components, including at least one elongated plastic sheet, ballast material, and a pulling means.

BACKGROUND OF THE INVENTION

Floating boom devices for containing spills of fluids such as crude oil on open water are well-known. Examples of typical devices are disclosed in U.S. Pat. No. 4,300,856 to Magoon et al. and U.S. Pat. No. 4,248,547 to Brown. Such devices are manufactured in sections and are delivered to the spill site and are pulled into location around the spill by a marine vessel. Sections of the devices are connected together to provide sufficient length to surround the oil spill.

The materials used to construct the disclosed devices are relatively heavy and bulky. The resulting devices are supposed to be relatively long term barriers, but in fact, they are effective for a limited duration.

While such devices are reasonably effective in containing oil spills, they suffer from several shortcomings. First, the materials used to manufacture the disclosed devices result in boom devices that are expensive ($25–$30 per foot) and that are not easily stored.

The relatively bulky nature of the disclosed boom devices causes an additional problem with their use. To be effective, the containment boom devices need to be placed around the oil spill as quickly as possible after the spill. Limits of available storage space act to restrict the length of boom devices that can be stored at any given location. Thus, a large oil spill can require a greater length of boom device than is readily availale due to the restrictions on the length of boom devices that can be stored. In such cases, addition boom device sections must be transported to the spill site and the relatively bulky nature of the disclosed boom devices also acts to limit the amount of boom device that can be transported to the spill site in a brief period of time. The recent oil spill in Prince William Sound in Alaska illustrates the problems caused by delays in storing and transporting containment boom devices.

Attempts have been made to lessen the bulk of the boom devices. For example U.S. Pat. No. 3,563,036 to Smith et al. uses an inflation means to inflate float sections only when the boom device is needed. The disclosed device continues to require substantial storage space and is subject to the same limitation of other premanufactured devices.

Additionally, since the disclosed devices are premanufactured, they generally cannot be adjusted to reflect local conditions of a specific spill, such as the fluid spilled, and the water and weather conditions.

As illustrated by the present discussion, there are a number of desirable features for a floating boom device for containing fluid spills on open water. It would be desirable to be able to have a boom device with a plurality of float sections that are interconnected in a continuous manner which has attached below an elongated weighted section, where said boom device can be manufactured from its constituent components at the site of an oil spill, and pulling means. Further, it would be desirable have the boom device to be manufactured from components that are relatively inexpensive, readily available, and relatively easy to store and transport.

While the above discussion was centered on floating boom devices for containing fluid spills on open water that are manufactured at the spill site, it is not intended that the invention be limited to this situation. It will be obvious from the description that follows that the present invention will be useful in other applications with problems common to those described herein.

SUMMARY OF THE INVENTION

It is the object of the present invention to provide a floating boom device for containing spills of fluid such as crude oil on open water which can be manufactured at the site from its constituent components.

It is also the object of the present invention to provide a floating boom device for containing spills of fluid such as crude oil which has a plurality of float sections interconnected in a continuous manner, has an elongated weighted section, which extends substantially along the length of the device, attached to the plurality of float sections from below, and which also has a pulling means.

It is also the object of the present invention to provide a floating boom device for containing spills of fluid such as crude oil which is manufactured from constituent components that are relatively inexpensive, readily available, and relatively easy to store and transport.

It is another object of the present invention to provide a method for containing spills of fluid such as crude oil with a floating boom device that can be manufactured at the spill site.

It is the further object of the present invention to provide a floating boom device for containing spills of fluid such as crude oil which can be adapted for the local conditions of the spill site.

The present invention achieves these objectives and other objectives which will become apparent from the description that follow, by providing a floating boom device for containing spills of fluid such as crude oil which can be manufactured at the spill site for its constituent components. The boom device has a plurality of float sections interconnected in a continuous manner and an elongated weighted section which extends substantially along the length of the device attached to the plurality of float sections from below. The boom device is manufactured from at least one continuous sheet of plastic that is folded along its longitudinal axis forming two wall sections of substantially equal height. The weighted section comprises ballast material and a pulling means introduced into the fold of the plastic sheet, and then has the wall sections horizontally sealed together substantially along its length. The plurality of the float sections is produced by vertically sealing the wall sections together at intervals above the first horizontal seal, pumping or injecting air between the wall sections, and then, horizontally sealing the tops of the wall sections together.

In an alternative embodiment of the present invention, two continuous plastic film sheets are used to manufacture a floating boom device for containing a spill of fluid such as crude oil at the spill site. In this embodiment, two longitudinal edges, one from each plastic sheet, are joined together and then folded along the longitudinal axis of the resulting joined plastic film sheet. The boom device in this embodiment is then manufactured in the same manner as the above embodiment.

Another embodiment of the present invention also uses two continuous plastic film sheets. In this embodiment, a plurality of float sections interconnected in a continuous manner is formed with one plastic film sheet and an elongated weighted section is formed with the second plastic film sheet. After the plurality of float sections and weighted section are manufactured, they are joined together to form a floating boom device.

Yet another embodiment of the present invention uses a pulling means which also serves as the ballast material.

An additional embodiment of the present invention manufactures the boom device using a laminated film. This laminated film uses a flexible material with relatively high tensile strength between two plastic sheets to give it higher sheer strength than simple plastic film. When laminated film is used, it will be possible in some applications to manufacture the boom device without a separate pulling means as discussed in the above embodiments.

A further alternative embodiment of the present invention uses diagonal seals instead of vertical seals in creating the plurality of float sections. In addition to the diagonal seals, numerous alternative embodiments of the present invention are possible by modifying the shape and configuration of the individual float sections and the elongated weighted section of the boom device.

BRIEF DESCRIPTION OF THE DRAWINGS

FIG. 1 is a partial isometric cross sectional view of a preferred embodiment constructed in accordance with the present invention.

FIG. 1A is a cross sectional view of a preferred embodiment constructed in accordance with the present invention taken along lines 1A in FIG. 1.

FIG. 3 is a partial isometric cross sectional view of an alternative preferred embodiment constructed in accordance with the present invention.

FIG. 3A is a cross sectional view of an alternative preferred embodiment constructed in accordance with the present invention taken along lines 3A in FIG. 3.

FIG. 7 is a partial isometric cross sectional view of an alternative preferred embodiment constructed in accordance with the present invention.

FIG. 7A is a cross sectional view of an alternative preferred embodiment constructed in accordance with the present invention taken along lines 7A in FIG. 7.

FIG. 8 is a partial isometric cross sectional view of an alternative preferred embodiment constructed in accordance with the present invention.

FIG. 8A is a cross sectional view of an alternative preferred embodiment constructed in accordance with the present invention taken along lines 8A in FIG. 8.

DETAILED DESCRIPTION OF PREFERRED EMBODIMENTS

Figure 2A:
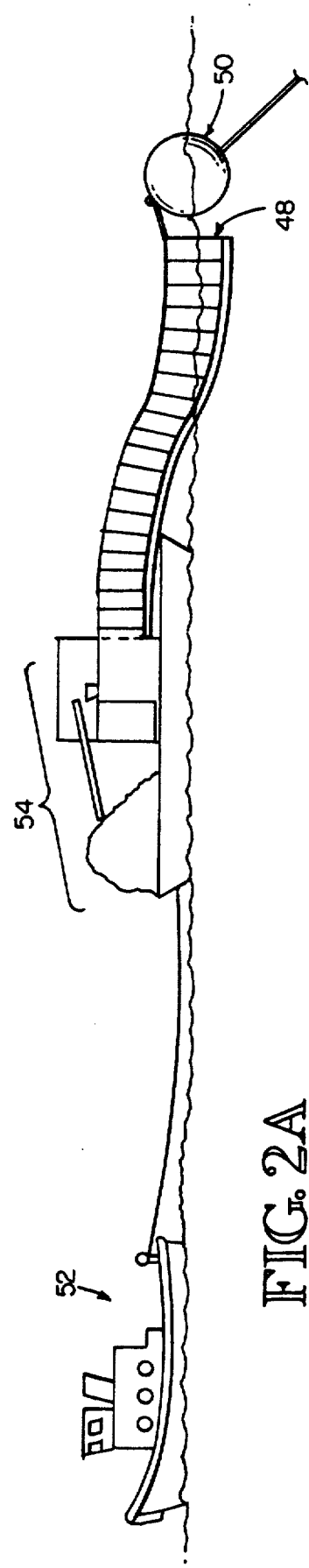
FIG. 2A is an environmental side elevational view of a preferred embodiment constructed in accordance with the present invention.

With reference to FIG. 1, a floating boom device 10 is shown. At its upper edge 12, the boom device has a plurality of float sections 14 which are interconnected in a continuous manner. Along its lower edge 16, an elongated weighted section 18 which extends substantially along the length of the boom device. The weighted section contains ballast material 20 to provide its weight. Sand is used as ballast material in the present invention due to its ready availability and low cost, although other relatively dense materials such as lead shot or gravel, or even dirt could be used. In calm waters, water could be used as ballast material with a narrow boom.

Figure 4:
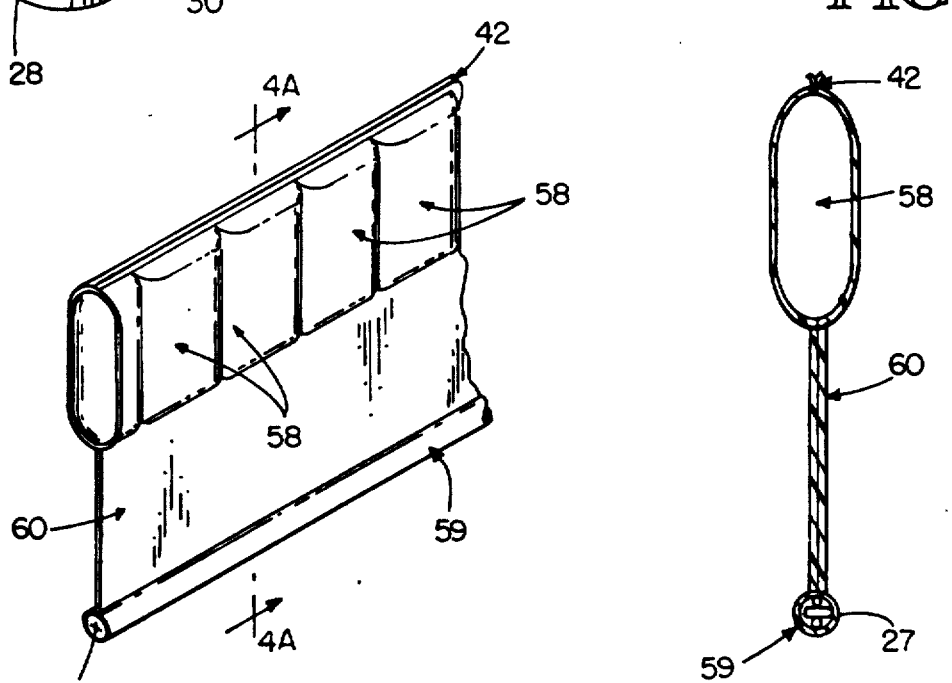
FIG. 4 is a partial isometric cross sectional view of an alternative embodiment constructed in accordance with the present invention.

A pulling means 24 is also provided for the boom device, which allows the boom device to be pulled into open water. Linked metal chain is used as the pulling means in the present invention, although other means such as hawser or metal cable can be used. In this embodiment, the pulling means is located within the weighted section, although the pulling means 26 is placed elsewhere in the boom device as shown in FIG. 3. In an alterative embodiment shown in FIG. 4, the metal chain used as the pulling means 24 also can be used as the ballast material.

Figure 10:
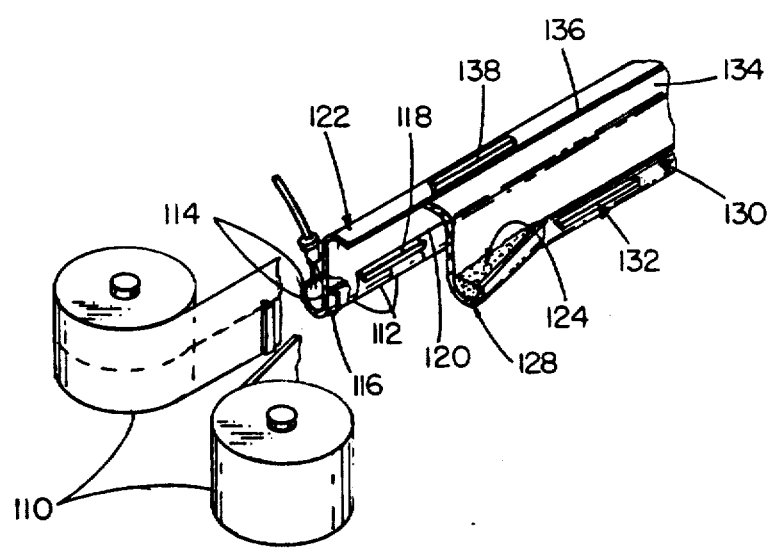
FIG. 10 is an isometric view of the manufacture of an alternative preferred embodiment constructed in accordance with the present invention.

For certain applications, a separate pulling means can be eliminated entirely by manufacturing the boom device with laminated film instead of regular single sheet plastic film. Laminated film incorporates flexible material with relatively high tensile strength between two plastic sheets to increase its sheer strength. Materials such as graphite fiber or fiberglass mats could be used as the strengthening material. As a result, the boom device could be constructed without a separate pulling means if the amount of boom device were not too large and the water in which the boom was to be placed were fairly calm. A device manufactured using the laminated film would be no different from any of the variations embodied in figures shown and discussed in the specification. The only difference would be that no chain or cable would be inserted into the elongated weighted section during manufacture. FIG. 10, which illustrates the manufacturer of an alternative embodiment of the present invention, shows the manufacturer of a boom device without a separate pulling means.

If the environmental conditions were extremely mild and only a short piece of boom device were needed, it is even possible that the boom device could be constructed from normal plastic film without a separate pulling means.

Figure 2:
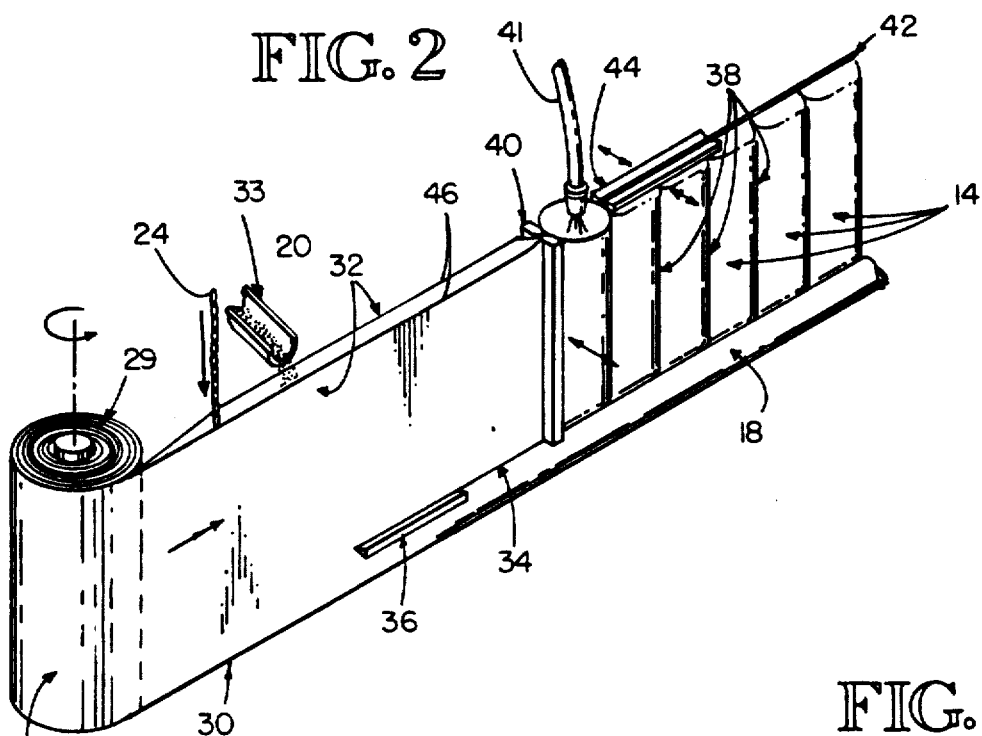
FIG. 2 is an isometric view of the manufacture of a preferred embodiment constructed in accordance with the present invention.

As shown in FIG. 2, the boom device is manufactured from a continuous plastic sheet 28, which can be provided on a roll 29. Experimentation indicates that the plastic sheet should have a thickness of approximately 4 mil or greater. A fold 30 is created along the longitudinal axis of the plastic sheet which forms two wall sections 32 of substantially equal height. In FIG. 2, the plastic film sheet is folded on a roll, but the fold may be formed after the sheet is unrolled. A placement means, such as an auger 33, places the ballast material in the longitudinal fold. The pulling means is placed in the longitudinal fold at the same time.

After the pulling means and the ballast material are placed in the longitudinal fold, a first horizontal seal 34 is formed when the wall sections are sealed together by a first horizontal sealing means 36. Means for sealing plastic film are well known and include heat embossing and sonic sealing. The first horizontal seal extends substantially along the length of the boom device. The first horizontal seal can be continuous or it can have gaps (not shown).

The plurality of float sections in manufactured by first creating a plurality of vertical seals 38 by sealing the wall sections together at intervals with the vertical sealing means 40. As soon as a vertical seal is created, air is pumped or injected 41 between the wall sections substantially filling the cavity created. Finally, a second horizontal seal 42 is formed by a second horizontal sealing means 44, such as heat embossing which seals the tops 46 of the wall sections together substantially along the length of the boom device.

As the boom device is created, one end 48 of the pulling means is attached to an anchor means 50, such as a sea anchor or fixed device, as shown in FIG. 2A. A marine vessel 52 pulls the means 54 producing the boom device at rate which allows the boom device to be placed in the water as the device is produced. The vessel continues to place the boom device into the water until the spill is surrounded. Boom device can be produced as long as the constituent components are available and can be restocked. Alternatively, the production means could be held stationary, for example placed on a beach and a marine vessel could pull the boom device into the water as it is produced.

Any number of different configurations for the boom devices and float sections are possible. This flexibility allows the device to be adjusted for the type of fluid spilled, water conditions, and other variables at the spill site. FIGS. 1, 1A, and 3-8A have been included in an attempt to illustrate some of the possible configurations available when manufacturing the boom device in accordance with the present invention. It should be noted however that the illustrated configurations are by no means exhaustive of the possibilities available with the present invention.

Figure 4A:
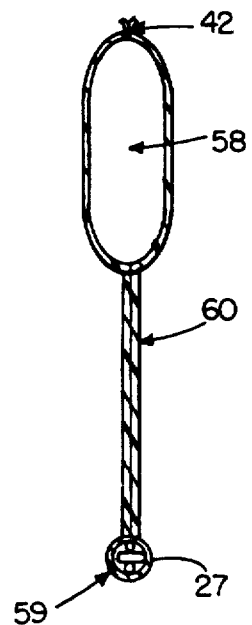
FIG. 4A is a cross sectional view of an alternative preferred embodiment constructed in accordance with the present invention taken along lines 4A in FIG. 4.

Two configurations of the float sections using substantially vertical cross sections are shown in FIGS. 1, 1A, and 3-5A. The vertical float section configuration 56 in FIGS. 3 and 3A is similar to that shown in FIGS. 1 and 1A with the only difference being the fact that the pulling means has been placed above the weighted section. The float sections 58 in FIGS. 4 and 4A have a substantially vertical cross section but differ from the float sections in FIGS. 1 and 3 in that the float sections do not extend completely down to the weighted section 59. Instead there is a portion of the boom device 60 between the float sections and the weighted section which is simply an area in which the two wall sections 32 are in substantial contact with each other.

Figure 5:
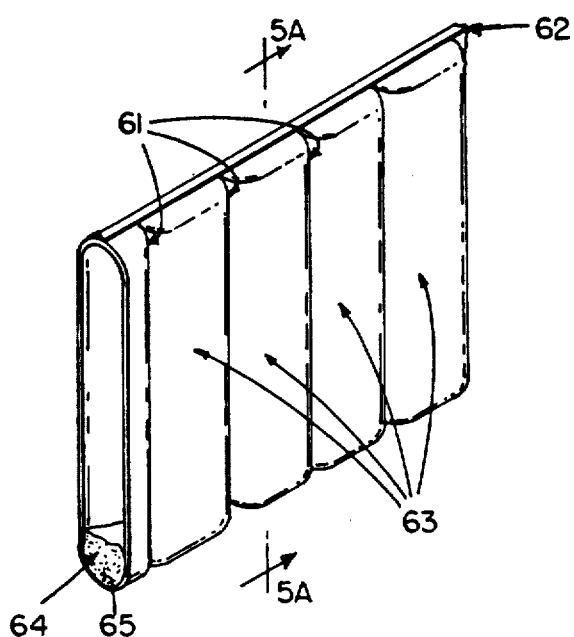
FIG. 5 is a partial isometric cross sectional view of an alternative preferred embodiment constructed in accordance with the present invention.
Figure 5A:
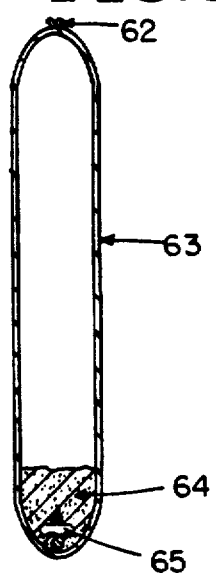
FIG. 5A is a cross sectional view of an alternative preferred embodiment constructed in accordance with the present invention taken along lines 5A in FIG. 5.

Another variation in the float section configuration is shown in FIGS. 5 and 5A. In this configuration, a separate weighted section has not been created. Rather, the vertical seals 61 extend substantially from the bottom of the boom device to the top of the boom device, where there is a single horizontal seal 62 creating a plurality of float sections 63 with a substantial vertical cross section in which the weighted material 64 and pulling means 65 are located substantially near the bottom of the float sections.

Figure 6:
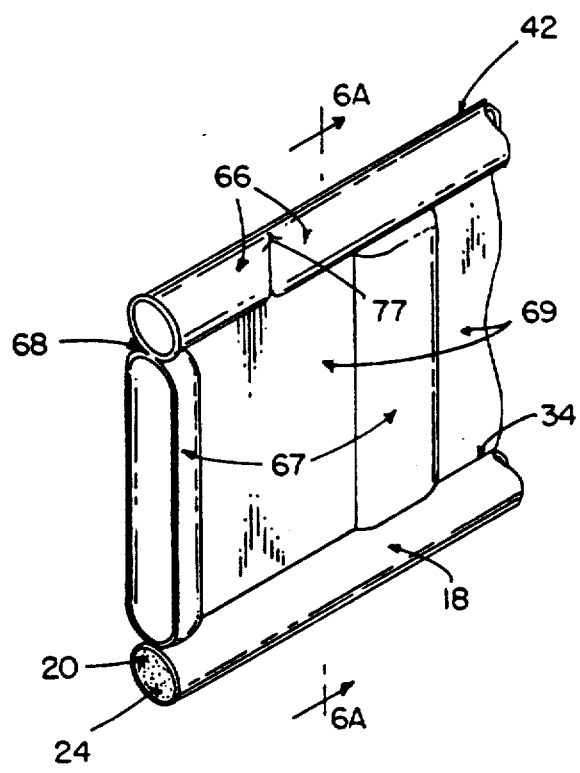
FIG. 6 is a partial isometric cross sectional view of an alternative preferred embodiment constructed in accordance with the present invention.
Figure 6A:
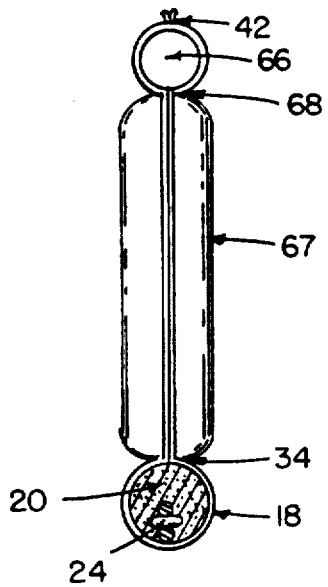
FIG. 6A is a cross sectional view of an alternative preferred embodiment constructed in accordance with the present invention taken along lines 6A in FIG. 6.

The configuration illustrated in FIGS. 6 and 6A combines a plurality of float section 66 with a substantially horizontal cross section with a plurality of float sections 67 of substantially verical cross sections. The substantially horizontal and substantially vertical float sections are separated by a third horizontal seal 68 which extends substantially along the length of the boom device. As shown, the substantially vertical float sections occur only at intervals with non-inflated sections 69 between them. This configuration could also be combined with a substantially vertical float section such as shown in FIGS. 1 or 3 where there were no uninflated sections.

The float section configuration illustrated in FIGS. 7 and 7A utilizes two pluralities of float sections of substantially horizontal cross sections 70 and 72 separated by a substantially horizontal seal 74, and with a portion 76 between the plurality of float sections and the weighted section 18 in which the wall sections 32 are in substantial contact with one another. It should be noted that float sections with substantially horizontal cross sections do have vertical seals 77, but typically they are separated by longer intervals than are the vertical seals for float sections with substantially vertical cross sections.

FIGS. 8 and 8A illustrate a boom device using a float section configuration in which the float sections 78 are created by diagonal seals 80 extending from a first horizontal seal 82 which creates the weighted section 84 up to the top of the boom device where there is a second substantially horizontal seal 86.

By using a plurality of float sections, a boom device manufactured in accordance with the present invention can have the physical integrity of some of its float sections violated, i.e. they can collapse and lose their air, and the boom device will still perform its function. This can be a very useful characteristic in the oil spill environment where there may be a great deal of debris in the water and/or marine vessels passing over the boom device either accidentally or on purpose.

Figure 9:
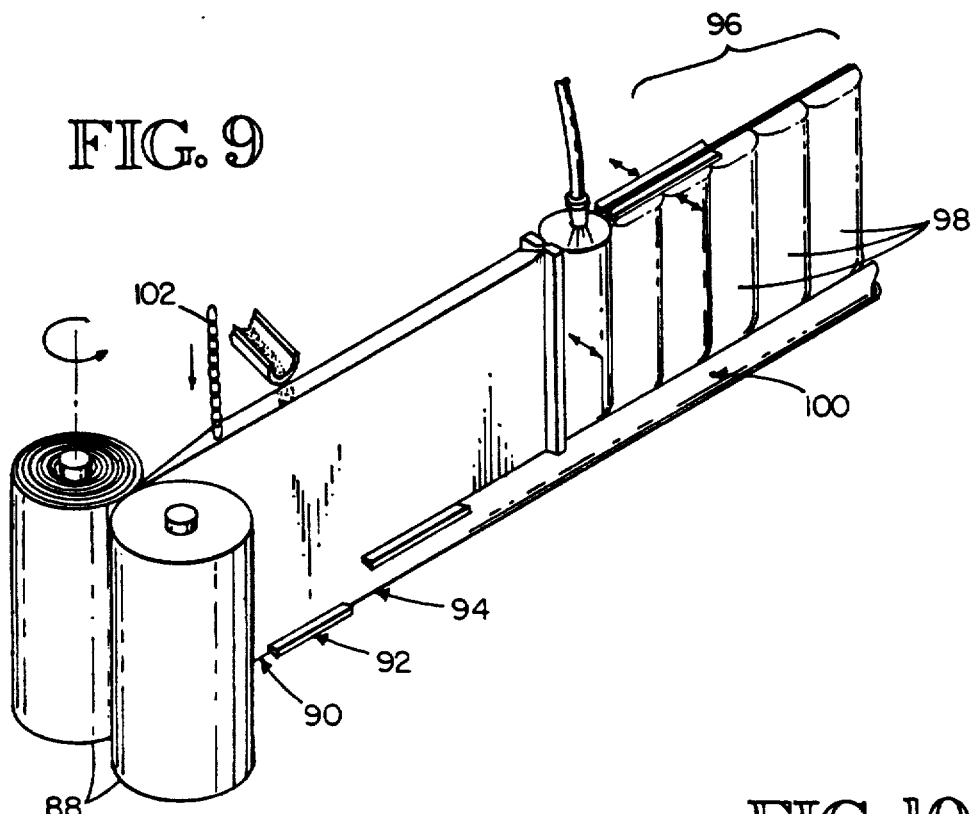
FIG. 9 is an isometric view of the manufacture of an alternative preferred embodiment constructed in accordance with the present invention.

In an alternate preferred embodiment, two elongated sheets of plastic film 88, are used, as shown in FIG. 9. In this embodiment, two longitudinal edges 90, one from each plastic film sheet, are sealed by a central sealing means 92 to form a central seal 94. A floating boom device 96 with a plurality of float sections 98 and an elongated weighted section 100 are created using the combined plastic sheets in a manner substantially similar to the above discussed embodiment. Additionally, any of the configurations for the float and weighted sections discussed and illustrated in above embodiment are equally applicable to this embodiment. As with the above embodiment, a pulling means 102 may also be used.

In another alternative preferred embodiment, two elongated plastic sheets 110 are used. As shown in FIG. 10, the boom device has a plurality of float sections 112, which are formed by folding one plastic sheet along its longitudinal axis to form two wall sections 114 which are sealed together at intervals by a vertical sealing means 116 and then pumping or injecting air between the wall sections. A first horizontal sealing means 118 seals the wall sections together substantially along the length of the plastic sheet to form a first horizontal seal 120 and leaving a first longitudinal edge 122 which extends beyond the first horizontal seal.

The second plastic sheet is folded along its longitudinal axis, and ballast material 124 is placed in the fold 128. A second horizontal seal 130 extending substantially along the length of the plastic sheet is formed by a second horizontal sealing means 132 with a second longitudinal edge 134 which extends beyond the second horizontal seal. The plurality of the float sections and the weighted sections are joined together at a central seal 136 which is formed by overlapping and sealing the first and second longitudinal edges together with a third sealing means 138 and which extends substantially along the length of the boom device.

Although this alternative embodiment is shown being manufactured with a float section of substantially horizontal cross section, any of the configurations of float sections discussed in the above embodiments are equally applicable to this alternative embodiment. Similarly, although no separate pulling means is shown in FIG. 10 for this alternative environment because FIG. 10 illustrates the boom device being manufactured laminated film, any configuration of weighted sections and pulling means described in the above embodiments are equally applicable to this embodiment.

The resulting invention is a floating boom device for containing fluid spills on open water which can be manufactured from its constituent components at the spill site. The components are relatively inexpensive, readily available, and relatively easy to store and transport. The cost of producing the boom device is less than 10% of the cost of the typical premanufactured oil containment boom device. The boom device also can be adapted for the local conditions at the spill site, such as the type of fluid spilled, and weather and water conditions. The resulting boom device with its plurality of float sections is resistant to sinking.

INDUSTRIAL APPLICABILITY

This invention finds application in manufacturing floating boom devices for containing spilled fluids on open bodies of water, and particularly allows for the manufacture of the boom devices from constituent parts at the spill site. Boom devices manufactured in accordance with the present invention are much less expensive than existing floating boom devices and can be varied to meet the environmental conditions of a particular spill site.

Other variations and embodiments of the present invention are contemplated. Those skilled in the art will readily appreciate such variations upon carefully reviewing the above disclosure. Therefore, the present invention is not to be limited by the above description, but is to be determined in the scope of the claims which follow.

What is claimed is:

1. A floating boom device for containing fluid spills on water comprising:
   at least one continuous sheet of plastic film with a longitudinal axis, said plastic film sheet being joined or folded along said longitudinal axis, forming a longitudinal fold and at least two wall sections, each wall section having a top;
   an elongated weighted section extending substantially along said boom device, said weighted section having ballast material located therein;
   a plurality of individual float sections, said individual float sections having air contained therein and bounded by a plurality of vertical seals formed by a vertical sealing means which seals said wall sections together at intervals, and a second horizontal seal formed by sealing said wall section tops together at least at each individual float section along the length of said plastic film sheet; and
   a means for introducing air into said float sections prior to said second horizontal seal's formation.

2. A floating boom device as claimed in claim 1, wherein :
   said plurality of float sections are each substantially airtight and connected together to adjacent sections;
   said elongated weighted section extends substantially along the length of said boom device, said weighted section containing ballast material and being connected to and located substantially under said plurality of float sections.

3. A floating boom device as claimed in claim 1 further including pulling means for pulling said boom through the water.

4. A floating boom device as claimed in claim 3, wherein said pulling means is an elongated member contained within said elongated weighted section.

5. A floating boom device as claimed in claim 4, wherein said pulling means is metal link chain.

6. A floating boom device as claimed in claim 1, wherein said wall sections were of substantially equal height.

7. A floating boom device as claimed in claim 5, wherein each said float section has a substantially horizontal cross section.

8. A floating boom device as claimed in claim 1, wherein said plurality of float sections are elongated and substantially vertically disposed, and said boom device further including a second plurality of float sections, said second plurality of float sections being elongated and substantially horizontally disposed.

9. A floating boom device as claimed in claim 1, and pulling means for pulling said device through the water.

10. A floating boom device as claimed in claim 1, wherein said ballast material is sand.

11. A floating boom device as claimed in claim 9, wherein said pulling means is metal link chain and is located in said elongated weighted section.

12. A floating boom device as claimed in claim 1, wherein said boom device further comprises:
   at least two continuous sheets of plastic film, each plastic film sheet having a longitudinal axis and at least one longitudinal edge, said plastic film sheets being joined together by sealing together one said longitudinal sheet edge from each plastic film sheet substantially along the plastic film sheet's length to form said elongated weighted sections and at least two wall sections with substantially equal height, each wall section with a top.

13. A floating boom device as claimed in claim 12, wherein said boom device further comprises:
   sand as said ballast material;
   metal link chain as said pulling means; and
   said pulling means is located within said elongated weighted section.

14. a floating boom device as claimed in claim 1, wherein said plurality of float sections are elongated and substantially horizontally disposed.

15. A floating boom device as claimed in claim 1, wherein said plurality of float sections are elongated and substantially vertically disposed.

16. A floating boom device for containing spills of fluids on water comprising:
   at least one continuous first sheet of plastic film with a first longitudinal axis, and with said first plastic film sheet folded along said first longitudinal axis forming a first longitudinal fold and for further forming a first taller wall section and a first shorter wall section, each said first wall section having a top;
   a plurality of float sections, said individual float sections having air contained between said first longitudinal fold, a plurality of vertical seals, formed by a vertical sealing means which seals said first taller wall section and said first shorter wall section together at intervals, and a first horizontal seal formed by a first horizontal sealing means sealing said first shorter wall section top to said first taller wall section substantially along the length of said first plastic film sheet;
   a first longitudinal edge formed from a portion of said first taller wall section which extends beyond said first horizontal seal;
   at least one continuous second sheet of plastic film with a second longitudinal axis and with second plastic film sheet folded along said second longitudinal axis forming a second longitudinal fold and a second taller wall section and a shorter wall section, with each wall section having a top;
   an elongated weighted section extending substantially along said boom device, said weighted section having ballast material located in second longitudinal fold and a second horizontal seal enclosing said ballast material and being formed by a second horizontal sealing means sealing said second shorter wall section top to said second taller wall section substantially along said second plastic film sheet and substantially parallel to said second longitudinal fold;
   a second longitudinal edge formed by a portion of said second taller wall section that extends beyond said second horizontal seal;
   a third horizontal seal formed by a third horizontal sealing means which seals said first and second longitudinal edges together substantially along the length of said boom device, said third horizontal seal being substantially parallel to said first and second horizontal seals;
   a means for introducing air into said float sections prior to formation of said formation of first horizontal seal; and
   a pulling means, said pulling means being a flexible substantially unstretchable elongated material which extends substantially along the length of said boom device and is attached to said boom device.

17. A floating boom device as claimed in claim 16, wherein said plurality of float sections are substantially vertically disposed, and said boom device further including a second plurality of float sections, said each of said second plurality of float sections being substantially horizontally disposed.

18. A floating boom device as claimed in 16, wherein said boom device further comprises:
   sand as said ballast material; and
   metal link chain as said pulling means;
   said pulling means being located within said elongated weighted section.

19. A floating boom device for containing fluid spills on water comprising:
   at least one continuous sheet of plastic film with a longitudinal axis, and with said film having a substantially unstretchable material laminated to at least a portion thereof, said film being folded along said longitudinal axis forming a longitudinal fold and opposed wall sections of substantially equal height, each wall section having a top;
   an elongated weighted section extending substantially along said boom device, said weighted section having ballast material located in said longitudinal fold and a first horizontal seal enclosing said material, said first horizontal seal being formed by a first horizontal sealing means sealing said wall sections together along a seam substantially parallel to said longitudinal fold;
   a plurality of float sections, said float sections having air contained between said first horizontal seal, a plurality of vertical seals formed by a vertical sealing means which seals said wall sections together at intervals, and a top seal formed by sealing said wall section tops together substantially along the length of said film; and
   a means of introducing air into said float sections prior to said top seal formation.

20. A floating boom device as claimed in claim 19, wherein said float sections are elongated and substantially vertically disposed.

21. A floating boom device as claimed in claim 19, wherein said float sections are elongated and substantially horizontally disposed.

22. A floating boom device as claimed in claim 19, wherein said unstrechable material is graphite fiber.

* * * * *